Patented Sept. 12, 1939

2,172,374

UNITED STATES PATENT OFFICE 2,172,374

POLYMERIZATION PROCESS

Paul J. Flory, Wilmington, Del., assignor to E. I. du Pont de Nemours & Company, Wilmington, Del., a corporation of Delaware No Drawing. Application November 9, 1937, Serial No. 173,719

9 Claims. (Cl. 260—561)

This invention relates to polymeric materials and more particularly to polyamides.

This invention has as an object a new and useful method for preparing highly condensed polyamides. A further object is to increase the molecular weight of solid polyamides without changing their physical form. A still further object is to convert solid non-fiber-forming polyamides into fiber-forming polyamides without altering their physical form. Other objects will become apparent as the description proceeds.

These objects are accomplished, as will be more fully described hereinafter, by a process in which the degree of polymerization of a polymer of the diamine-dibasic acid type is increased by heating the polymer in the solid state, that is at a temperature below its melting point, but high enough to effect polymerization, and by continuing the heat treatment under these polymerizing conditions until a polymer of the desired properties is formed.

The polyamides with which the present process is concerned are derived from diamines and dibasic acids and form one group of a new class of artificial fiber-forming materials known as "synthetic linear condensation polymers" described in Patent 2,071,250. These products (superpolymers) are crystalline in character. They are obtained by heating bifunctional reactants in substantially equimolecular proportions and under condensation polymerization conditions until the product has a sufficiently high molecular weight to exhibit fiber-forming properties. In the case of the present polyamides these reactants are diamines and dibasic acids, the latter including the amide-forming derivatives which may be used instead of the acids. As is described in the mentioned patent, the fiber-forming polymers are made either by conducting the reaction in the presence of a solvent or by heating the molten polymer, the reaction temperature being above the melting point of the superpolymer and above the melting point of the intermediately formed lower molecular weight polymer. In later descriptions by the same inventor of the above mentioned polyamides specifically (British Patent 461,237) it is again emphasized that in the absence of a solvent or medium, the final stage of the reaction must be carried out at a temperature above the melting point of the superpolyamide.

The present discovery that fiber-forming synthetic linear condensation polyamides of the diamine-dibasic acid type can be obtained by polymerization in the solid state of lower molecular weight polyamides is quite surprising. In fact chemical reactions in the solid state are exceedingly rare, one recorded instance being doubted by Ricci, J. Am. Chem. Soc. 59, 1764 (1937). This reaction, which forms the basis of the present invention, is particularly useful in converting non-fiber-forming polyamides (low molecular weight) into fiber-forming polyamides (high molecular weight).

When, as described in the above mentioned patents, a diamine and a dicarboxylic acid or an amide-forming derivative of a dibasic carboxylic acid are heated together at polyamide-forming temperatures, above 120° C. and preferably between 180° to 300° C., under conditions permitting the removal of the by-product (water in the case of the free acid), a polyamide is formed whose molecular weight increases progressively as the heating is continued. The increase in molecular weight is accompanied by an increase in intrinsic viscosity, where intrinsic viscosity is defined as in the above mentioned British patent. During the first stage of the reaction the polyamide present in the reaction mass does not exhibit fiber-forming properties, but as the reaction proceeds its molecular weight increases until finally it acquires fiber-forming properties. These fiber-forming polyamides are distinguished from those of lower molecular weight in that the former may be identified by their capability of being formed into useful textile fibers which exhibit fiber orientation under X-ray examination. In general the polyamide does not acquire fiber-forming properties until its intrinsic viscosity reaches at least 0.4. To obtain the best fiber-forming products the reaction should be continued until the intrinsic viscosity is above 0.6.

The present invention is primarily concerned with the conversion of low molecular weight or "half-made" polyamides of the diamine-dibasic acid type into fiber-forming polyamides. The half-made polymers, which are used as starting material, can be prepared in a number of ways. For example, they can be prepared by heating the monomeric reactants under polymerizing conditions and stopping the reaction when the molecular weight of the product is still relatively low. A very convenient method for making the half-made polymer consists in heating the diamine and dibasic acid at polymerizing temperatures, e. g., 180–300° C., in a closed system in the presence of water under the conditions described in co-pending application Serial Number 160,191 filed by E. W. Spanagel August 20, 1937. A low molecular weight polyamide is invariably obtained under these conditions, for in the presence of water a condition of equilibrium is reached in which polymerization and hydrolysis occur at the same rate and the equilibrium is such that a low molecular weight product is formed. Obviously the molecular weight is dependent upon the amount of water present. The intrinsic viscosity of polyamides prepared in the presence of water is usually from 0.15 to 0.35.

The half-made polymer, which is generally quite brittle and readily pulverizable, is then heated in the solid state below its melting point, but sufficiently high to cause polymerization, under conditions permitting the escape of water or other by-product formed from the further polymerization. The reaction should preferably be carried out in the absence of oxygen. Passage of an inert gas over or around the solid polymer aids in the removal of the water. The reaction may also be conducted under reduced pressure.

Although polymerization often occurs at temperatures as low as 120° C., it does not occur at an appreciable rate until the temperature reaches 180° C. Most polyamides of the diamine-dibasic acid type have melting points above 180° C. so they can be converted readily into high molecular weight polyamides by the process of this invention. Polyamides derived from diamines of formula $NH_2CH_2RCH_2NH_2$ and dicarboxylic acids of formula $HOOCCH_2R'CH_2COOH$ or amide-forming derivatives thereof, in which R and R' are divalent hydrocarbon radicals free from olefinic and acetylenic unsaturation and in which R has a chain length of at least two atoms, represent a valuable class of polyamides. An especially valuable subclass within this class are those in which R is $(CH_2)_x$ and R' is $(CH_2)_y$, in which $x$ and $y$ are integers and $x$ is at least 2. In its preferred embodiment, therefore, this invention comprises the conversion of low molecular weight polyamides of these classes into fiber-forming polyamides by polymerization in the solid state.

The following example in which parts are by weight illustrates the invention more specifically:

A mixture of 1,048 parts of hexamethylene diammonium adipate (the salt derived from hexamethylenediamine and adipic acid), 3.45 parts of adipic acid, 3.31 parts of hexamethylene diammonium acetate, and 187 parts of water, was charged into a stainless steel autoclave. After purging the autoclave with oxygen-free nitrogen, it was sealed and heated at 225° C. for two hours, the maximum pressure developed being 225 lbs. per square inch. The autoclave was then cooled and the wet half-made polymer (non-fiber-forming) removed. Examination of a test portion of the half-made polymer showed that it had an intrinsic viscosity of 0.27. This half-made polymer was then heated in the solid state at 259° C. (4° below its melting point) in a current of oxygen-free nitrogen. This caused the intrinsic viscosity of the polymer to increase rapidly. At the end of 15 minutes heating the polymer had fiber-forming properties; at the end of 3 hours heating it had an intrinsic viscosity of about 0.9 and yielded excellent fibers.

Since the polyamide mentioned in the foregoing example melts at approximately 263° C. under oxygen-free conditions, it can be polymerized at relatively high temperatures, 200 to 260° C. being particularly useful, and hence can be polymerized quite rapidly in the solid state. The invention is applicable generally to polyamides of the diamine-dibasic acid type although less advantageously so in the case of low melting polyamides.

The most useful polyamides are those having a melting point above 220° C. For these polyamides as well as for those of lower melting point the most advantageous temperature range is from 2 to 20° C. below the melting point of the polyamide.

The following table lists a number of representative polyamides which can be polymerized in the solid state according to the process of this invention:

| Polyamide derived from— | Polyamide M. P. °C. |
|---|---|
| Ethylenediamine and sebacic acid | 254 |
| Tetramethylenediamine and adipic acid | 278 |
| Tetramethylenediamine and suberic acid | 250 |
| Tetramethylenediamine and azelaic acid | 223 |
| Tetramethylenediamine and sebacic acid | 239 |
| Tetramethylenediamine and undecandioic acid | 208 |
| Pentamethylenediamine and malonic acid | 191 |
| Pentamethylenediamine and glutaric acid | 198 |
| Pentamethylenediamine and adipic acid | 223 |
| Pentamethylenediamine and pimelic acid | 183 |
| Pentamethylenediamine and suberic acid | 202 |
| Hexamethylenediamine and sebacic acid | 209 |
| Hexamethylenediamine and beta-methyl adipic acid | 216 |
| Hexamethylenediamine and 1,2-cyclohexanediacetic acid | 255 |
| Octamethylenediamine and adipic acid | 235 |
| Octamethylenediamine and sebacic acid | 197 |
| Decamethylenediamine and carbonic acid | 200 |
| Decamethylenediamine and oxalic acid | 229 |
| Decamethylenediamine and sebacic acid | 194 |
| Decamethylenediamine and para-phenylene diacetic acid | 242 |
| Para-xylylenediamine and sebacic acid | 268 |
| 3-methyl-hexamethylenediamine and adipic acid | 180 |
| 3,3'-diaminopropyl ether and adipic acid | 190 |

The melting points represented in the table were determined by placing fine particles of the polyamide on a heated metal block and observing the fusion temperature. If the polyamides are heated in a glass tube in the absence of oxygen, the melting points observed are usually from 5 to 20° higher.

Instead of being applied to polyamides derived from a single diamine and a single dibasic acid the present process may be applied to interpolymers derived from diamine-dibasic acid mixtures containing more than two reactants. In general, however, the melting points of these products are considerably lower than those of the simple polyamides, so their polymerization in the solid state is a rather slow process.

This invention is also applicable for the polymerization in the solid state of polyamides containing various modifying agents, e. g., plasticizers, resins, pigments, dyes, antioxidants, oils, etc. It is also possible to mix two or more half-made polymers and polymerize them together in the solid state.

While it is normally most advantageous to apply this invention to the low polymer in bulk or finely divided state, it is within the scope of the invention to polymerize further in the solid state polyamides in the form of filaments, yarns, fabrics, bristles, ribbons, films, rods, molded articles, and the like.

For most purposes it is desirable that the final polyamide be "viscosity stable", i. e., be relatively insensitive to further polymerization or viscosity change on heating. This is particularly important if the polyamide is to be spun from melt into filaments, bristles, ribbons, films, or the like. Several methods, described more fully in application Serial Number 74,811 filed April 16, 1936, by W. H. Carothers, and in application Serial Number 83,809 filed June 5, 1936, by W. R. Peterson, may be employed to insure the formation of viscosity-stable polyamides; for example, an excess of either the diamine or dibasic acid may be used in preparing the polyamide. Another method consists in adding a monofunctional amide-forming derivative, e. g., a monocarboxylic acid or a monoamine to the polyamide-forming reactants. A mixture of stabilizers of these types may also be used. Thus, in the example the viscosity stabilizer consists of a mixture of adipic acid and hexamethylene diammonium acetate. By use of the proper amount of stabilizer it is possible to regulate at will the final molecular weight or intrinsic viscosity of the polyamide. In making polyamides for use in spinning filaments, it is generally desirable to employ sufficient viscosity stabilizer to arrest polymerization at an intrinsic viscosity of 0.6 to 1.5. Although it is preferable to add the viscosity stabilizer to the original reactants used to make the polyamide, it may be added to the half-made polymer.

The practice of this invention provides a convenient and economical process for converting low molecular weight polyamides into high molecular weight polyamides. The process can be carried out in simple equipment since no liquids are involved and the use of high pressures is unnecessary. It is especially well adapted to continuous operation.

Another advantage which this process has over polymerization in the molten state is that lower temperatures are required. As a result of this lower temperature the product contains less thermal decomposition products. This improves the spinning characteristics of the polymer since decomposition products tend to form bubbles during the melt spinning operation.

This invention is well adapted to the preparation of fiber-forming polyamides in a fine state of subdivision. The initial starting material, the half-made polymer, is usually quite brittle so that it can be broken up into any desired state of subdivision. Since the physical form of the polymer is maintained throughout the polymerization in the solid state, this invention provides a convenient method for producing finely divided high polymer. It is a difficult matter to break up high molecular weight polymer prepared by melt polymerization because of the toughness of the high polymer.

As many apparently widely different embodiments of this invention may be made without departing from the spirit and scope thereof, it is to be understood that I do not limit myself to the specific embodiments thereof except as defined in the appended claims.

I claim:

1. A process for producing a more highly condensed polymer from a lower molecular weight polyamide obtainable from approximately equimolecular proportions of diamine and dibasic acid which comprises heating said polyamide at polymerizing temperature below its melting point under conditions permitting escape of the by-product of the condensation reaction, and continuing such heating until said more highly condensed polymer is formed.

2. A process which comprises heating a non-fiber-forming polyamide derived from approximately equimolecular proportions of diamine and a substance of the class consisting of dicarboxylic acids and their amide-forming derivatives at polymerizing temperature below the melting point of the polyamide under conditions permitting escape of the by-product of the condensation reaction, and continuing such heating until a fiber-forming polyamide is formed.

3. A process which comprises preparing a non-fiber-forming polyamide from approximately equimolecular proportions of diamine and a substance of the class consisting of dicarboxylic acids and their amide-forming derivatives, heating the polyamide in a fine state of subdivision at polymerizing temperature below the melting point of the polyamide under conditions permitting escape of the by-product of the condensation reaction, and continuing such heating until a fiber-forming polyamide is formed.

4. The process set form in claim 1 in which said lower molecular weight polyamide has a melting point between 180° C. and 300° C.

5. The process set forth in claim 1 in which said lower molecular weight polyamide has a melting point above 220° C.

6. The process set forth in claim 1 in which said heating is at a temperature of from 2 to 20° C. below the melting point of said lower molecular weight polyamide.

7. The process set forth in claim 2 in which the diamine is of the formula $NH_2CH_2RCH_2NH_2$ and the dicarboxylic acid is of the formula $HOOCCH_2R'CH_2COOH$, in which R and R' are divalent hydrocarbon radicals free from olefinic and acetylenic unsaturation and in which R has a chain length of at least two atoms.

8. The process set forth in claim 2 in which the diamine is hexamethylene diamine and the dicarboxylic acid is adipic acid.

9. A process for increasing the molecular weight of a polyamide obtainable from approximately equimolecular proportions of a diamine of formula $NH_2CH_2RCH_2NH_2$ and a dicarboxylic acid of formula $HOOCCH_2R'CH_2COOH$, in which R and R' are divalent hydrocarbon radicals free from olefinic and acetylenic unsaturation and in which R has a chain length of at least two atoms, comprising heating said polyamide at polyamide-forming temperatures and below its melting point until said polyamide has undergone a substantial increase in intrinsic viscosity.

PAUL J. FLORY.